Sept. 25, 1923.                                                                   1,469,060
                              C. W. WEISS
                         TRANSMISSION DEVICE
               Filed Feb. 3, 1923                     3 Sheets-Sheet 1
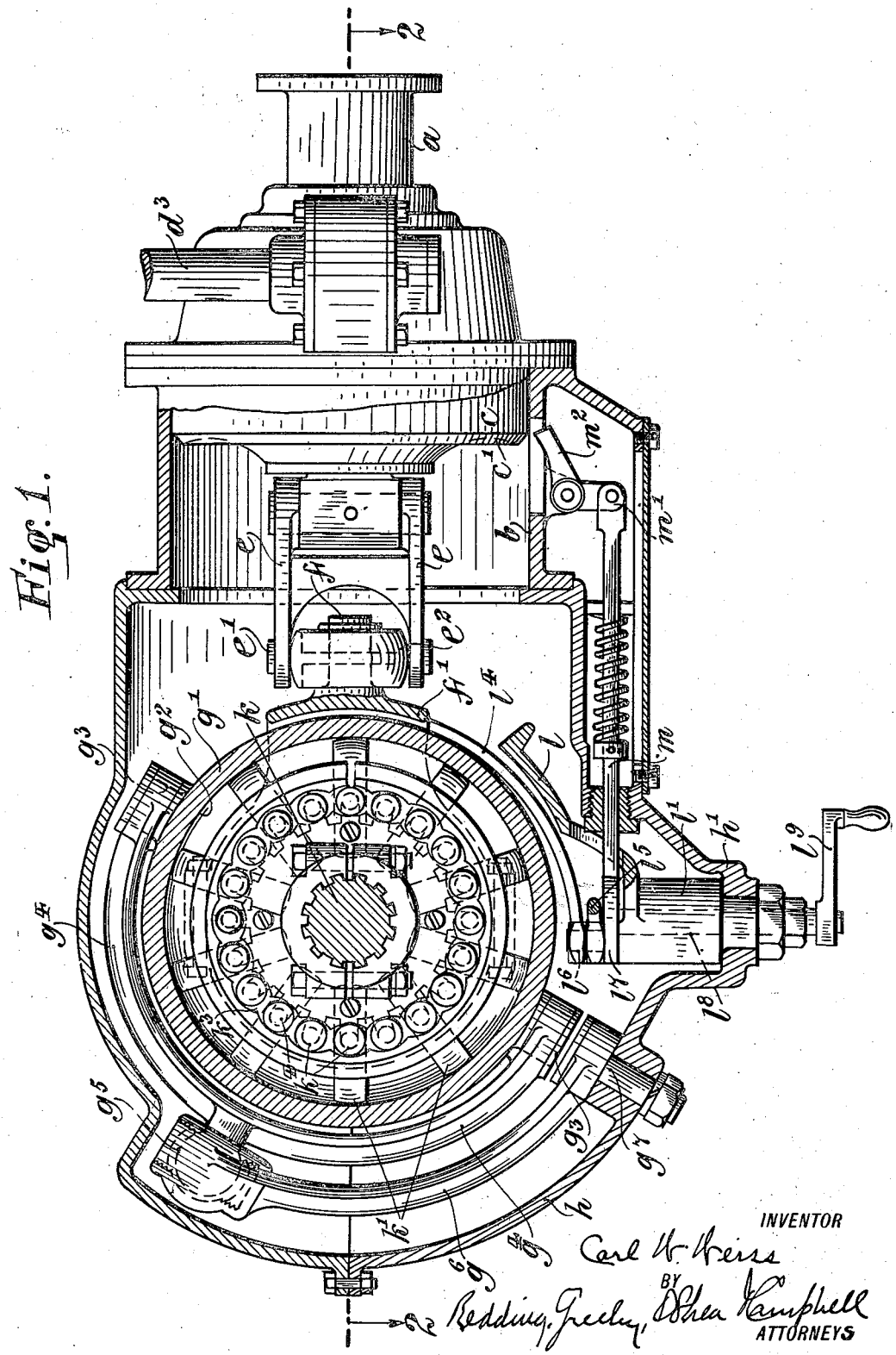
INVENTOR
Carl W. Weiss
BY
Redding, Greeley, O'Shea Campbell
ATTORNEYS

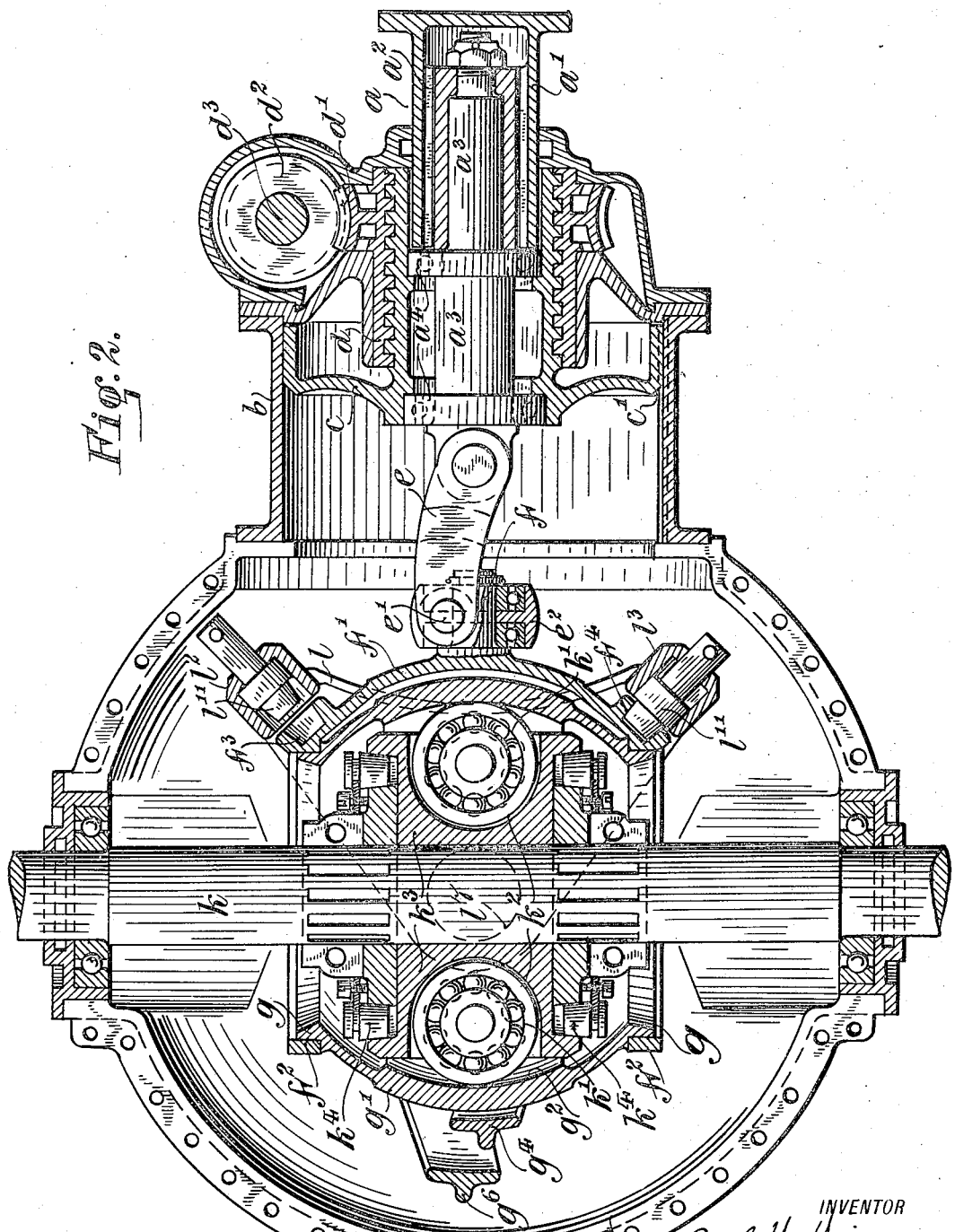

Sept. 25, 1923.
C. W. WEISS
TRANSMISSION DEVICE
Filed Feb. 3, 1923
1,469,060
3 Sheets-Sheet 3
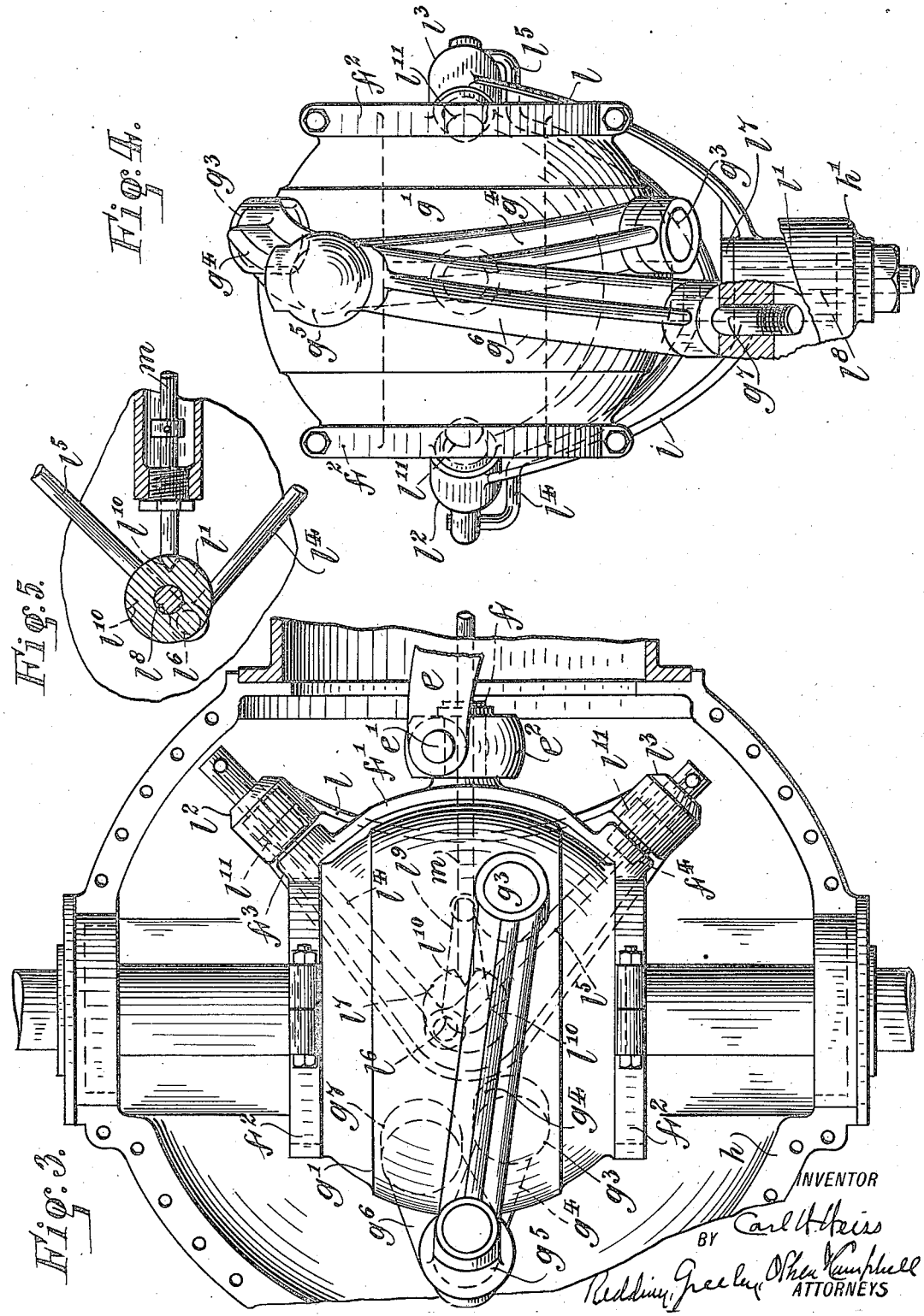

Patented Sept. 25, 1923.

1,469,060

UNITED STATES PATENT OFFICE.

CARL W. WEISS, OF BROOKLYN, NEW YORK.

TRANSMISSION DEVICE.

Application filed February 3, 1923. Serial No. 616,635.

*To all whom it may concern:*

Be it known that I, CARL W. WEISS, a citizen of the United States, residing in the borough of Brooklyn of the city of New York, in the State of New York, have invented certain new and useful Improvements in Transmission Devices, of which the following is a specification, reference being had to the accompanying drawings, forming a part hereof.

This invention has for its objects the provision of means by which a nutating transmission device, of the general character disclosed in Letters Patent of the United States No. 1,146,982, dated July 20, 1915, can be applied directly to the driving of a driven member, the axis of which is not aligned with the axis of the driving member but is at a right angle or some other angle therewith; and the provisions of means by which the movements of the mutor are so controlled that the direction of rotation of the driven member can be reversed at will and the mutor allowed substantially equal nutating movement for either direction of drive. Such an arrangement might be desirable, for example, in the application of such a transmission to a locomotive.

In accordance with the invention the nutating element or mutor is so constructed and so related to the driving member and the driven member of the transmission that power can be transmitted directly from the driving member to the driven member through the nutating element without the interposition of other devices although the axis of the driven member is at an angle to the axis of the driving member. In further accordance with the invention the nutating element consists of two parts, one of which is connected, as heretofore, to the driving member by a link connection, while the other, as heretofore, has a spherical bearing surface for co-action with the gripping elements carried by or connected to the driven member.

The invention will be explained more fully hereinafter with reference to the accompanying drawings in which a convenient and practical embodiment thereof is illustrated and in which—

Figure 1 is a view partly in central section in a plane at right angles to the axis of the driven member, of one form of transmission apparatus in which the invention may be embodied.

Figure 2 is a view of the same partly in horizontal section, on the plane indicated by the broken line 2—2 of Figure 1, looking in the direction of the arrows.

Figure 3 is a view of some of the parts shown in Figure 2 as seen from above.

Figure 4 is a view of the parts shown in Figure 3 as seen from the left hand, the housing being omitted.

Figure 5 is a detail view of some of the parts as seen from below in Figure 1.

The driving member $a$, supported in the housing $b$ is shown as provided with an extensible or slip joint to permit of the angular displacement of the mutor as hereinafter explained. As shown, the part $a'$ of the driving member, which is not supposed to be capable of longitudinal displacement, has a splined connection, as at $a^2$, with the co-axial part $a^3$ which, by collars as at $a^4$, is mounted in a carrier $c$ which is capable of longitudinal movement in the cylindrical portion $b$ of the housing. The carrier is threaded for engagement with a sleeve nut $d$ which is suitably mounted in the housing and is provided with a worm wheel $d'$ for engagement with a worm $d^2$ on a shaft $d^3$, whereby the axial position of the part $a^3$ can be regulated at will to control the ratio of speed transmission.

The part $a^3$ of the driving member is connected by a link $e$ and a cross pin $e'$ with a sleeve $e^2$ which encircles a stud $f$ of the part $f'$ of the mutor. The part $f'$ of the mutor is carried by annular bearing members $f^2$ on the annular ends $g$ of the truncated spherical part $g'$ of the mutor, such truncated spherical part having an internal, spherical bearing surface $g^2$ for co-operation with and support by the gripping elements of the driven part as hereinafter described.

To produce movement of rotation of the driven member $k$ with respect to the mutor, or vice versa, it is necessary that the other of such elements be restrained from rotation. To hold the member $g'$ of the mutor so that it shall have the necessary freedom of nutating movement, while being restrained from rotation, such member has trunnions $g^3$ mounted in a yoke or forked member $g^4$ which is connected through a ball and socket joint $g^5$ at one end of an arm $g^6$ pivotally mounted at $g^7$ on the housing $h$, the center of the ball and socket joint having an angular movement about its point always equal to one-half of the angle of nutation. This socket joint is in the central plane of the mutor transverse to the latter's longitudinal axis.

The part $f'$ of the mutor, as will be understood, receives from the driving member $a^3$ through the link $e$, a movement of nutation about the center of the spherical member $g'$, which center lies at the intersection of the axes of the driving member $a^3$ and the driven member $k$, whatever may be their angular relation, while the spherical member $g'$, supported by and co-operating with the gripping elements $k'$, which are carried directly by the driven member $k$, is held from rotation but with freedom for movement of nutation by the means above described. There is, as between the parts $f'$ and $g'$ of the mutor, a relative movement of rotation or rockable movement, as the parts $f'$ and $g'$ have movement imparted to them by their operative connections while they are swivelled about one or the other of the pins $l^{11}$.

The two parts of the nutating element or mutor have a relative movement of rotation and means are provided for restraining and locating the combined movement of the two parts so that the resultant of the movement of the two parts is imparted directly to the driven member without the inter-position of any element other than the gripping elements which are carried directly by the driven member. The restraint is applied to the two-part mutor through a pivotal engaging means, or pin $l^{11}$ which, as hereinafter explained, is so supported as to have freedom of movement in the arc of a circle, and the axis of the pivotal engaging means intersects the axes of the driving member and the driven member in the center of nutation of the motor and is disposed, when the driving member and the driven member are at an angle of 90°, at an angle of 45° with the axis of the driven member so that the movement of the nutation shall take place about such point of intersection as a true center. Provision is also made whereby the engagement of the pivotal engaging means with the mutor can be made at will at one side or at the other of the axis of the driving member so that the direction of the movement of nutation of the nutating element or mutor can be changed at will for the purpose of effecting a reversal of the movement of the driven member. The angle of the axis of the pivotal engaging means or pin with the axis of the driven member, as it will be noted, is one-half of the angle between the axis of the driving member and the axis of the driven member, so that if the driving member and the driven member stand at an angle other than 90°, as 80°, for example, the angle of the axis of the pivotal support with the axis of the driven member will be one-half of that or, in the case stated, 40° on one side or 50° (one-half of 100°) on the other side. In order that the true movement of the stud $f$ in the spherical plane may be accomplished, the axes of the driving member, the driven member, the mutor and the pivotal stop or carrier pin must intersect in the true center of the mutor in a common plane. In the foregoing it is assumed that the driven member extends in both directions from the axis of the driving member, as must be the case where reversing is contemplated, but if it extends in one direction only, as may be the case when there is to be no reversing, the relations above stated must exist and the angle of the axis of the pivotal engaging means or pin with the axis of the driven member must be one-half of the angle between the axis of the driven member and the axis of the driving member.

To provide a necessary point of reaction for the mutor, so that the power of the driving member shall be applied to the driven member, there is provided the pivotal engaging means or pin $l^{11}$ as mentioned above, for engagement with the part $f'$ of the mutor, such pivotal engaging means or pin having, in the construction shown, its axis disposed at an angle of 45° to the axis of the mutor and being free to move in the arc of a circle in a plane parallel to a plane which includes the axes of the driving member and the driven member. As shown, a quadrant carrier $l$, having a hub $l'$, which is mounted in the housing at $h'$ so as to have freedom of movement about the vertical axis, is provided at $l^2$ and $l^3$ with said pins $l^{11}$ adapted for engagement with sockets $f^3$ and $f^4$ formed on the part $f'$ of the mutor. Each stop pin is engaged at its outer end by a corresponding actuating link $l^4$, $l^5$.

The two links are mounted on a crank pin $l^6$ of a crank disc $l^7$ which is fixed on a shaft $l^8$ mounted in the hub $l'$ of the quadrant carrier $l$ and provided with an operating handle $l^9$. By rotating the handle $l^9$ the part $f'$ of the mutor can be engaged either through the socket $f^3$ or through the socket $f^4$, with the pins $l^{11}$ of the oscillating carrier $l$ and thereby the movement of nutation of the mutor be controlled and restrained and caused to take place in such relation to the driving member and the driven member that, through the co-operation of the spherical bearing surface $g^2$ of the part $g'$ of the mutor with the gripping elements $k'$, movement of rotation is imparted from the part $g'$ of the mutor to the driven member $k$ in one direction or the other as the case may be.

In order to prevent the possibility of reversal of the direction of rotation of the driven part without first moving the mutor to the neutral point, the crank disc $l^7$ is formed with two triangular notches $l^{10}$ adapted for engagement respectively with a spring pressed locking rod $m$ which is connected at its other end with a pivotal stop $m'$. The latter is pivoted on the housing $b$ in such position that its toe $m^2$ may co-operate with a shoulder $c'$ on the carrier $c$. When the crank disc has been rotated to either position to effect engagement of the part $f'$ of the mutor with the oscillating carrier $l$, the stop rod $m$ enters the corresponding notch and moves the toe $m^2$ out of the path of the carrier $c$, but when the cam disc $l^7$ is in any intermediate position, the toe $m^2$ stands in the path of the carrier $c$ and prevents movement thereof from the neutral or zero position. Conversely, when the cam disc is in either of its limit positions and the carrier $c$ is forward of its initial position, it is impossible to move the cam disc and therefore to change the connection of the quadrant carrier and the part $f'$ of the mutor, for the purpose of reversing, until the carrier $c$ has been moved back to its initial position and the mutor is in its zero or neutral position.

It will be understood that the gripping elements $k'$ co-act with the internally spherical member $g'$ in the same manner as described in said Letters Patent. As shown, the gripping elements comprise freely rotatable members $k^2$ supported each by a carrier $k^3$ which is movable radially by means of adjustable cones $k^4$ so as to regulate the pressure of the gripping elements against the internally spherical member $g'$, in proportion to the torque resistance of the driven member.

It will be understood that the speed ratio as between the driving member and the driven member is determined by axial movement of the driving member $a^3$ to vary the angular displacement of the mutor, as fully described in said Letters Patent. It will also be understood that through the control of the movement of the mutor as herein described, the driven member is driven directly from the driving member through the mutor without the interposition of any elements other than the gripping elements, which co-operate with the internally spherical member of the mutor in the same manner as described in said Letters Patent, and that, through the connection of the mutor to the oscillating carrier at one side or the other of the axis of nutation, the driven member can be driven in one direction or the other at will.

When the parts are in the positions shown in Figure 1 and the driving member is set in motion, no movement in either direction is imparted to the driven member because the angularly displaceable element or link $e$ is then in its neutral position and the sleeve $e^2$ rotates about the stud $f$ of the part or body $f'$ of the mutor without imparting to such part or body a movement of nutation. If then the driving member receives axial movement toward the mutor the element $e$ will be displaced angularly and movement of nutation will be imparted to the part or body $f'$ and thence through the part or body $g'$ to the driven member. The direction of movement of the driven member will be determined by the selection of one or the other of the pins $l^{11}$ and its movement to effect at the point $l^2$ or the point $l^3$ the pivotal engagement of the two members $f'$ and $g'$.

Various changes can be made in details and construction to suit different conditions of use and the invention, therefore, is not restricted to the particular construction shown and described herein, except as pointed out in the claims.

I claim as my invention:

1. A transmission device comprising a driving member, a nutating element consisting of two relatively movable parts and having one part operatively connected to the driving member, and the other part having a spherical bearing surface, a driven member having gripping elements for co-action with the second-named part of the nutating element, and means to control the movement of the nutating element.

2. A transmission device comprising a driving member, a nutating element consisting of two relatively rotatable parts and having one part operatively connected to the driving member, and the other part having a spherical bearing surface, a driven member having gripping elements for co-action with the second named part of the nutating element, and means to control the movement of the nutating element.

3. A transmission device comprising a driving member, a nutating element consisting of two relatively movable parts and having one part operatively connected to the driving member, and the other part having a spherical bearing surface, a driven member having gripping elements for co-action with the second named part of the nutating element, and a pivotal stop to engage the mutor and restrain and control the movement thereof.

4. A transmission device comprising a driving member, a nutating element consisting of two relatively movable parts and having one part operatively connected to the driving member, and the other part having a spherical bearing surface, a driven member having gripping elements for co-action with the second named part of the nutating element, a pivotal stop to engage the mutor and to restrain and control the movement thereof, and an oscillating carrier to support said stop.

5. A transmission device comprising a driving member, a nutating element consisting of two relatively movable parts and having one part operatively connected to the driving member, and the other part having a spherical bearing surface, a driven member having gripping elements for co-action with the second-named part of the nutating element, an oscillating carrier, and means to engage the mutor pivotally with the carrier at either side of the axis of the mutor.

6. A transmission device comprising a driving member, a nutating element consisting of two relatively movable parts and having one part operatively connected to the driving member, and the other part having a spherical bearing surface, a driven member having gripping elements for co-action with the second-named part of the nutating element, means to vary the angular displacement of the mutor, two sets of devices to restrain and control the movement of the mutor to effect movement in one direction or the other, and interlocking devices co-operating with said means and said last named devices.

7. A transmission device comprising a driving member, a nutating element consisting of two relatively movable parts and having one part operatively connected to the driving member and the other part having a spherical bearing surface, a driven member having gripping elements for co-action with the second-named part of the nutating element, and means to hold the second-named part of the nutating element from rotation while permitting free movement of nutation thereof.

8. A transmission device comprising a driving member, a nutating element consisting of two relatively movable parts and having one part operatively connected to the driving member and the other part having a spherical bearing surface, a driven member having gripping elements for co-action with the second-named part of the nutating element, a yoke having pivotal engagement with the second-named part of the nutating element, and an arm having at one end a fixed pivotal support and at the other end a universal connection with the yoke.

9. A transmission device comprising a driven member, a nutating body operatively connected to the driven member to drive the same responsive to its nutations, an axially shiftable driving member the axis of which is at an angle to the axis of the driven member, an angularly displaceable element pivoted to said driving member, and means operatively connecting the angularly displaceable element to the nutating body and controlling the nutations of the latter to cause the nutating member to drive the driven member.

10. A transmission device comprising a driven member, a nutating body operatively connected to the driven member to drive the same responsive to its nutations, an axially shiftable driving member the axis of which is at an angle to the axis of the driven member, an angularly displaceable element between the nutating body and said driving member and pivoted to the latter, means comprising a second nutating body movable with respect to the first nutating body and operatively connecting said pivoted element to the first nutating body, and means providing a swivel axis about which said two nutating bodies are moved during their nutations when the driving member is rotated.

11. A transmission device comprising a driven member, a driving member, means comprising a nutating element operated by the driving member and through its nutating movements driving the driven member, and means controlling the character of nutation of the nutating element in a manner to effect reversal of the direction of rotation of the driven member.

12. A transmission device comprising a driven member, a nutating body operatively connected to the driven member to drive the same responsive to its nutations, an axially shiftable driving member, an angularly displaceable element between the nutating body and said driving member and pivoted to the latter, and means operatively connecting the nutating body with the angularly displaceable element to effect rotation of the driven member in either direction while the angularly displaceable element is rotated in one direction.

13. A transmission device comprising a driving member, a driven member, a nutating element consisting of two relatively movable bodies and having one of said bodies operatively connected with the driving member and the other body operatively connected with the driven member, and means controlling the character of nutation of the nutating element in a manner to effect reversal of the direction of rotation of the driven member.

14. A transmission device comprising a driving member, a nutating element consisting of two relatively movable bodies and having one of said bodies operatively connected with the driving member, and the other body having a spherical bearing surface, a driven member having gripping elements for co-action with the second-named nutating body, and means controlling the character of nutation of the nutating element in a manner to effect reversal of direction of rotation of the driven member.

15. In a transmission device capable of producing reversal of rotation of a driven member, the combination of a driving member and said driven member, the axis of one being at an angle to the axis of the other, a mutor having two relatively movable bodies, one of said bodies having a concave spherical surface, the center of which coincides substantially with the intersection of said axes, gripping elements co-acting with said spherical surface for operatively connecting the same with the driven member, means connecting the other nutating body with the driving member, and means comprising a plurality of pivotal parts engaging, one or the other, with said last mentioned nutating body, said pivotal parts lying on opposite sides of the axis of the driving member, the engagement of one or the other of said pivotal parts with said last mentioned nutating body determining the direction of rotation of the driven member.

16. In a transmission device capable of producing reversal of rotation of a driven member, the combination of a driving member and said driven member, the axis of one being at an angle to the axis of the other, a mutor having two relatively movable bodies, one of said bodies having a concave spherical surface, the center of which coincides substantially with the intersection of said axes, gripping elements co-acting with said spherical surface for operatively connecting same with the driven member, means connecting the other body with the driving member, and means comprising a movable member having a plurality of pivotal parts engaging, one or the other, with different points on said last mentioned nutating body, said pivotal parts lying on opposite sides of the axis of the driving member and in radii which respectively substantially bisect the angles formed between the axes of the driven and driving members, the engagement of one or the other of said pivotal parts with the different points on the said last mentioned body determining the direction of rotation of the driven member.

17. In a transmission device capable of producing reversal of rotation of a driven member, the combination of a driving member and said driven member, the axis of one being at an angle to the axis of the other, a mutor having two relatively movable bodies, one body having a concave spherical surface, the center of which coincides substantially with the intersection of said axes, and having its longitudinal axis coinciding with that of the driven member, a pivotal support upon which said last mentioned nutating body is mounted through universal joint connection, said universal joint lying in a plane through the center of said nutating body at right angles to the axis of the driven member, the second nutating body being journaled about said first body, and a rockable frame having pivotal engaging means on opposite sides of the axis of the driving member for engagement with said second nutating body at points on opposite sides of said driving member, said rockable frame being rockable in a direction longitudinally of the axis of the driven member, the engagement of one of said pivotal engaging means with the second nutating body determining the direction of rotation of the driven member.

This specification signed this 2d day of February, A. D. 1923.

CARL W. WEISS.